(12) United States Patent
Palmaer

(10) Patent No.: US 6,484,379 B2
(45) Date of Patent: Nov. 26, 2002

(54) METHOD FOR RADIUS LIMIT ADJUSTMENT ON RADIUS CONVEYOR BELTS

(75) Inventor: Eric K. Palmaer, Granite Bay, CA (US)

(73) Assignee: KVP Falcon Plastic Belting, Inc., Rancho Cordova, CA (US)

(*) Notice: Subject to any disclaimer, the term of this patent is extended or adjusted under 35 U.S.C. 154(b) by 0 days.

(21) Appl. No.: 09/810,876

(22) Filed: Mar. 16, 2001

(65) Prior Publication Data

US 2002/0129481 A1 Sep. 19, 2002

(51) Int. Cl.[7] .............................................. B65G 15/30
(52) U.S. Cl. ....................... 29/401.1; 198/852; 198/778
(58) Field of Search ........................ 29/401.1; 198/852, 198/778, 617

(56) References Cited

U.S. PATENT DOCUMENTS

| 4,901,844 A | | 2/1990 | Palmaer et al. | |
|---|---|---|---|---|
| 5,069,330 A | | 12/1991 | Palmaer et al. | |
| 5,139,135 A | * | 8/1992 | Irwin et al. | 198/852 |
| 5,372,248 A | * | 12/1994 | Horton | 198/852 |
| 5,775,480 A | * | 7/1998 | Lapeyre et al. | 198/852 |
| 5,921,379 A | * | 7/1999 | Horton | 198/852 |

* cited by examiner

Primary Examiner—David P. Bryant
Assistant Examiner—Jermie E. Cozart

(57) ABSTRACT

Plastic conveyor belts made up of modules interconnected by transverse rods and capable of straight or radius travel are adjusted as to minimum radius the belt can traverse by restricting collapsibility at the inner edge of the belt. This can be accomplished using shims in the slotted apertures of link ends, preventing full rod travel in those apertures, at each row or at alternating or selected rows of the belt; or shims otherwise placed in the belt to prevent full collapse; or by using different modules in certain rows, with less collapsibility; or by substituting different edge modules in belts of multiple modules per row. In this way, a basic radius conveyor belt can be defined, with a relatively tight minimum radius, and then can be modified so as to be custom-fitted to spiral conveyor or other belt systems having specific curve radii which are larger than the radius of the basic belt. By substantially matching the conveyor belt's minimum achievable radius to the actual radius in service on the conveyor belt system, better driving performance is achieved, eliminating belt edge chatter and vibration.

16 Claims, 3 Drawing Sheets

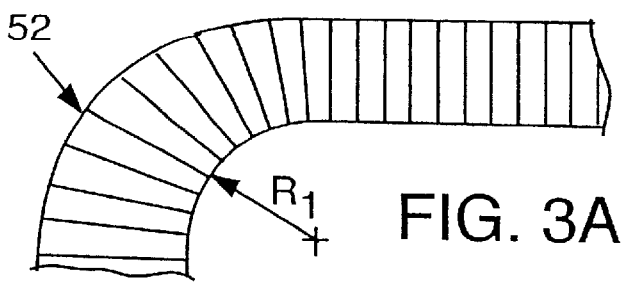
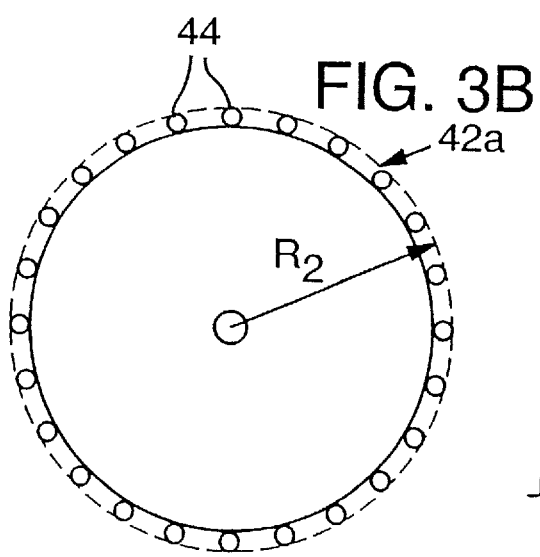
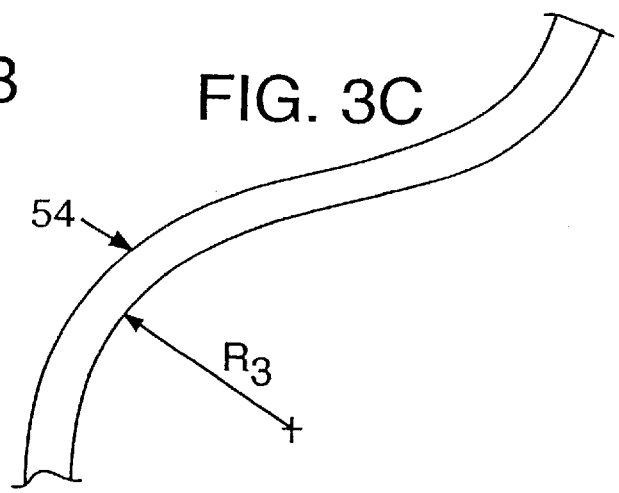
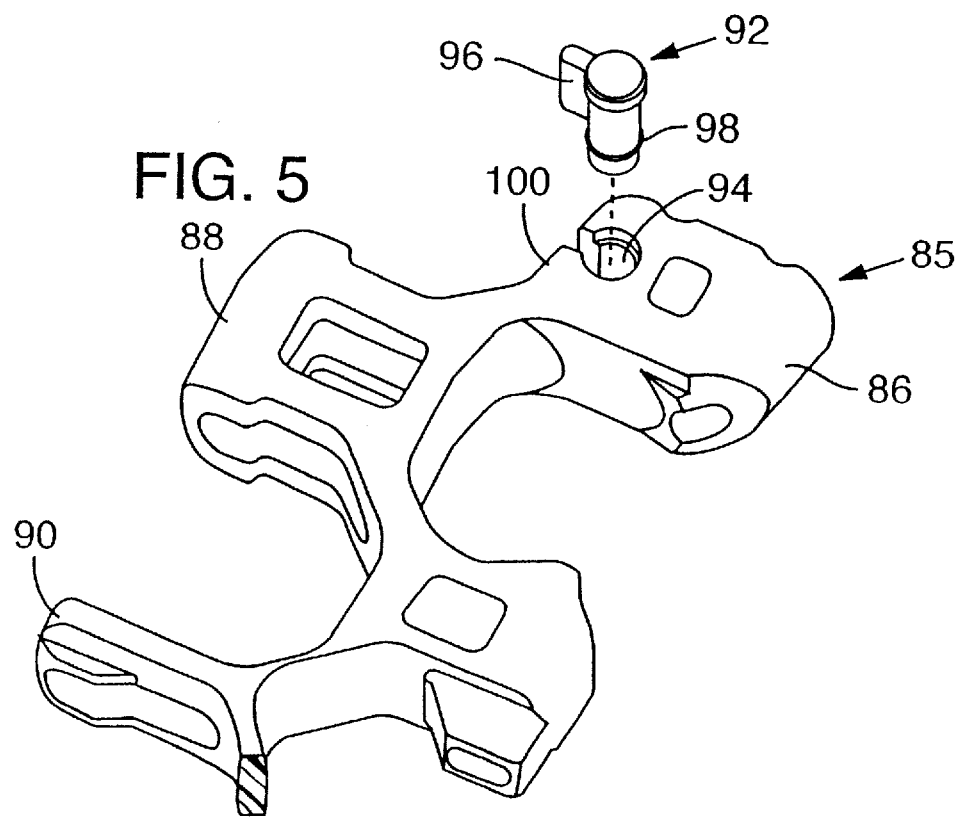

METHOD FOR RADIUS LIMIT ADJUSTMENT ON RADIUS CONVEYOR BELTS

BACKGROUND OF THE INVENTION

This invention concerns plastic modular conveyor belts, and is particularly concerned with such conveyor belts of the radius type, that travel around curves as well as straight paths, and with fitting a belt of a certain minimum radius to a particular radius of curvature in a spiral conveyor system or in other radius conveyor travel.

Radius conveyor belts of the type with which this invention is concerned are shown in U.S. Pat. Nos. 4,742,907, 4,901,844, 5,181,601 and 5,573,105. So called spiral conveyor belts, which travel in a helical path as driven by a driving cage or tower, are shown or described in U.S. Pat. Nos. 4,901,844 and 5,069,330.

Spiral conveyors are often fitted with modular plastic radius-type conveyor belts which have a certain minimum radius of is curvature. These belts are used to fit a variety of different radii of driving tower on the spiral systems, and thus are often not matched even approximately to the actual radius of the driving tower, the belt thus not fully collapsing at the inner side of the curve and not assuming its minimum radius as it travels along the driving tower. Typically the driving tower has bars which engage against the ends of module rows on the conveyor belt, and in nearly all cases, the spiral conveyor system is operated in an "overdrive" condition whereby the driving tower's actual speed of rotation is slightly faster than the belt inner edge travel speed. As a result, in the typical situation in which the modular conveyor belt is not assuming its minimum radius in being driven by the driving tower, the ends of module rows tend to bunch together and then jerk as a bar of the driving tower finally overcomes the group of row ends and moves forward beyond them. This causes a vibration or chatter to repeatedly occur at many different points along the inner edge of the belt. This repeated sticking and jumping back of the belt modules causes problems of uneven travel, premature wear and unsteady, unstable transport of the items being conveyed.

The same concern exists on non-spiral conveyor belts involving curving travel, where the belt is guided along the inside of the belt on curves and thus the inner edge must slide along a wear strip or guide at the edge of a belt platform. Again, the belt when on a curve whose radius is larger than the minimum possible radius of curvature of the belt can repeatedly stick and then jump forward because of the excess, unused collapse capability between the modules at the inner edge.

Therefore, it is desirable to substantially match the minimum radius of curvature of a belt to the actual radius of curvature of the system on which it is to travel, whether that system is a spiral conveyor belt system or another belt system wherein the belt travels around lateral curves. This is an object of the invention described below.

SUMMARY OF THE INVENTION

By the method of the invention, a radius plastic conveyor belt of the type described above is modified and adjusted so as to custom fit the belt to a specific radius of curvature as may be encountered on a spiral conveyor belt system or simply on a belt having lateral curves in its path of travel. In one preferred embodiment of the method the radius belt is defined as a basic radius conveyor belt with modules that allow a degree of collapse to define a preselected minimum radius of curvature small enough to allow the basic radius conveyor belt to be used on a plurality of conveyor systems having different curve radii. A belt system is selected for which the radius plastic conveyor belt is to be fitted, that belt system having curves which are larger in radius than the preselected minimum radius of curvature of the basic conveyor belt.

The basic radius conveyor belt is then modified by restricting its minimum radius of curvature to a larger radius than the preselected minimum radius, the larger radius substantially matching the actual radius of curvature of the belt system to which the belt is to be applied. This modification does not necessarily involve physically changing a belt; instead, the basic radius conveyor belt can be defined as containing a specific series of modules, but not actually assembled in that way. The modification can be simply by placing different elements in the basic belt as it is actually built, to provide the modified-radius belt. This is the intended meaning of the term modification, herein and in the claims.

Modification of the radius can be accomplished in several different ways. One method is to place at the inner side of the basic radius conveyor belt modules that are restricted to a more limited degree of collapse than the other modules, due to having shorter slotted apertures than the other modules, or other structural limitations to collapsing together. This can be done in every row, alternate rows, or every third row, etc., in regular fashion so as to restrict the ability of the belt to collapse together at the inner side in a way such as to limit the overall minimum radius of curvature of the belt, so that the row ends are substantially fully collapsed and bearing against one another at the inside of the curve, preventing chatter and vibration.

Another method for restricting curvature is to use a uniform array of modules, but to add restricting devices to modules at the inner side of the belt relative to curves. These restricting devices can be shims or stops placed in some of the slotted apertures or in other areas of the belt, such as against a center bar of the belt between adjacent projecting link ends, so as to prevent full collapsing together of the belt modules.

The shims or stops or modified modules with lesser degree of collapse can be located elsewhere than at the inner edge of the belt. For example, they could be located at about the middle of the belt, still being effective to limit collapse at the inner edge but allowing a flexibility or springing action at the inner edge which still can be objectionable if the inner edge is quite distant from the point where the collapse is limited. If modules with shorter slotted apertures are used, the slots preferably are positioned so as to allow full extension, to provide for tension across the full width of the belt in straight travel.

Another alternative is to restrict collapse at the same edge of the module rows by use of snap-on (or otherwise attachable) side plates or product holding devices which can be selected to restrict collapse as desired, to substantially match the desired radius. Product holding devices are often provided for snap-in attachment at or near belt edges, to provide a raised barrier. These can be configured to engage with each other in successive rows (or to engage with the succeeding module itself) to restrict radius as needed.

Thus, the invention in its broadest sense comprises a method for fitting a modular plastic radius conveyor belt as closely as possible to the particular radius of the path of travel of a designated installation, the method including defining a basic radius conveyor belt made up of a basic array of modules permitting radius travel in curves having tightness up to a particular minimum radius $R_1$, then, when a particular installation needing a radius belt is designated, that installation having a radius of curvature $R_2$ which is larger than $R_1$, modifying the basic radius belt by restricting the radius of the modular conveyor belt. This is done by substituting different modules at a series of regularly spaced locations or otherwise hampering by a preselected degree the ability of the belt to travel around curves, such that the minimum possible radius of the modified belt is substantially equal to the radius of curvature in the designated installation. The installation may be a spiral conveyor belt or a belt traveling generally horizontally but through lateral curves, particularly when the belt is guided around the curve at the inside edge of the belt.

It is thus among the objects of the invention to substantially match the minimum radius of curvature of a plastic modular conveyor belt to the actual curves of an installation for which the belt is designated, the method comprising modifying a basic set of modules (whether the basic conveyor belt is actually assembled with such modules or not) to restrict the minimum possible radius of the basic belt and thus to modify the belt to fit a particular curvature, and thereby to prevent or minimize chatter or "stick and slip" action at the inner edge of belt curves. These and other objects, advantages and features of the invention will be apparent from the following description of a preferred embodiment, considered along with the accompanying drawings.

DESCRIPTION OF THE DRAWINGS

FIGS. 3A, 3B and 3C show a basic radius modular conveyor belt having a minimum possible curve radius $R_1$, a spiral conveyor driving tower having a radius $R_2$ which is larger than $R_1$, and a belt travel path in a non-tower conveyor system having a curve with a radius $R_3$, also larger than $R_1$.

FIG. 5 is a perspective view showing a portion of a belt module with a plug-type insert for limiting the collapse of a conveyor belt made up of similar modules, at the inner edge of the belt.

DESCRIPTION OF PREFERRED EMBODIMENTS

Figure 1:
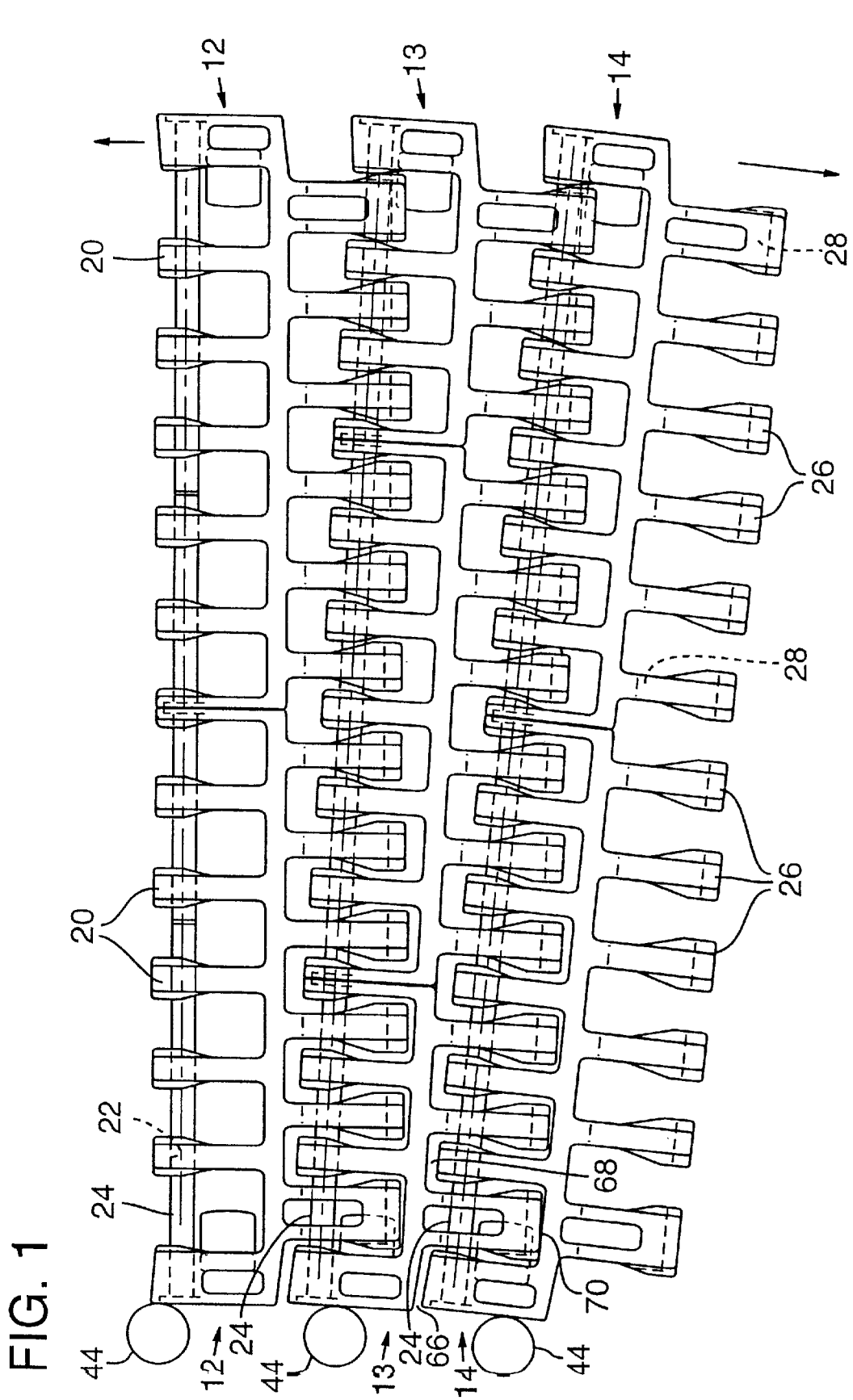
FIG. 1 is a plan view showing a radius-type plastic modular conveyor belt of the type with which the invention is concerned.

In the drawings, FIG. 1 shows a portion of a plastic modular belt 10 capable of travel around curves, and this belt can be considered a basic radius modular conveyor for purposes of the invention. This belt is essentially as described in U.S. Pat. No. 5,181,601 or 4,901,844. As is well-known, the belt has rows of modules 12, 13, 14, etc., each of which has at least one module and usually more than one module side by side to make up the row. Facing in one direction from each module are a plurality of first projections or projecting link ends 20 which have apertures 22 to receive a connecting rod 24. The other set of link ends, which can be called a second set of projecting link ends 26, have slotted apertures 28 so that the inner edge of the assembled conveyor belt can collapse the modules together as the belt travels around the curve, the collapsed edge being the inside edge.

As explained above, these belts are often guided around the inside of the curve in the conveyor belt support apparatus, that is, the edges of the inner sets of modules rub against a guiding wall or wear strip along the inside edge of the curve. This is true even though some of the above-referenced patents describe a system for guiding the belt from the outside of the curve. When the belt is guided around the inside of the curve, the module rows tend to stick and then slip repeatedly, bunching together and then jumping forward, a sort of chattering of the belt edge. This problem is particularly accentuated if the minimum possible radius of the conveyor belt is smaller than the actual radius in the curve being traversed. In that case, the modules have excess collapsing travel which is not used, so that the modules at the inner edge of the curve, in ideal travel, would not contact each other in fully collapsed condition, but rather would have spaces between the module rows at the inner edge. This gives the module rows at the inner edge an opportunity to bunch and then jump forward, or to "stick and slip", because of this freedom of movement afforded the inner edges of the rows.

As explained above, this problem can be particularly acute on spiral conveyor belts, driven in an overdrive arrangement. Again, the module edges have freedom to move back and forth, not being fully collapsed together, and tend to stick on a driving element and then jump back as the driving element advances forward.

Figure 2:
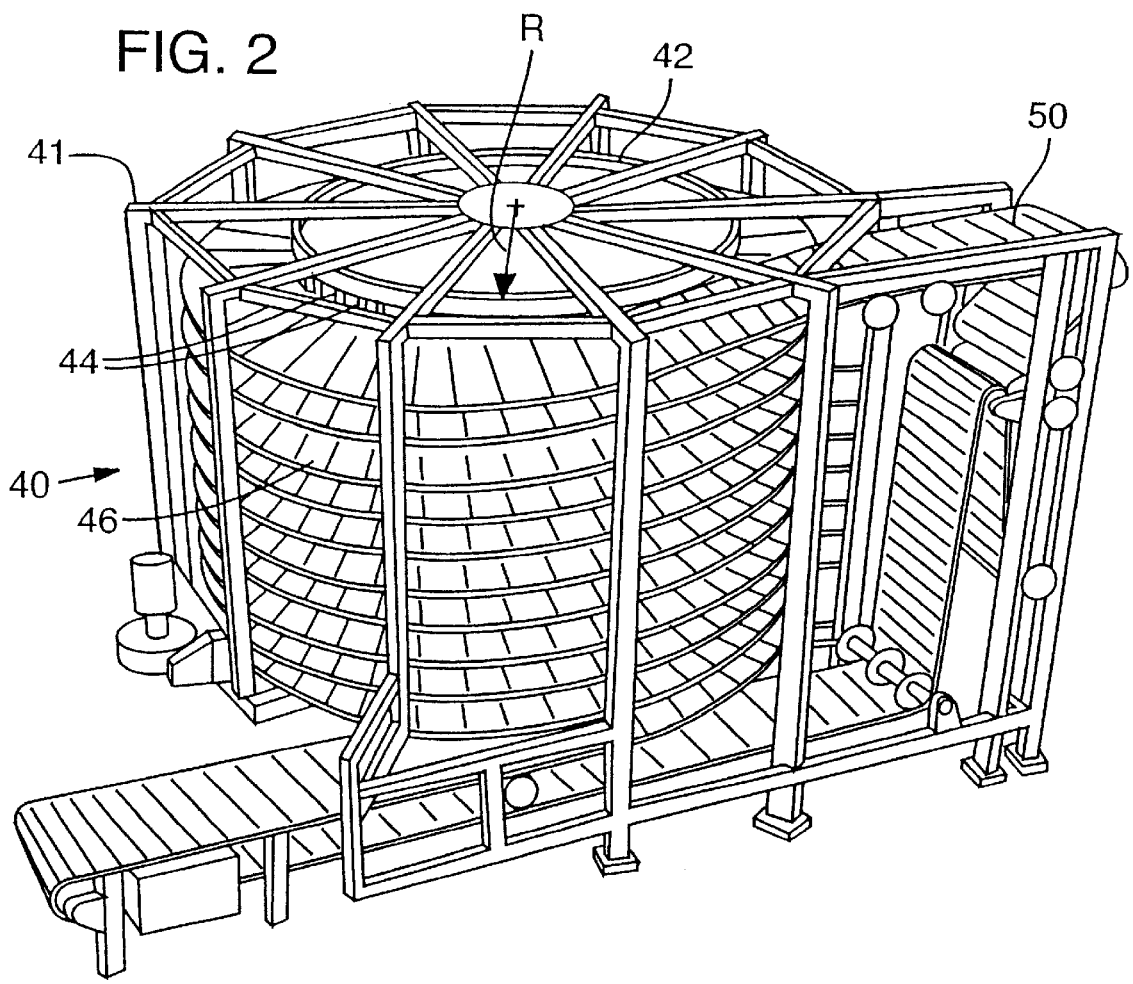
FIG. 2 shows a spiral conveyor belt system, to which the belt and method of the invention can be applied.

FIG. 2 shows somewhat schematically a spiral conveyor belt system 40. A system frame 41 supports a driving cage or tower 42, with bars 44 of the driving cage that engage the inner edges of the radius conveyor belt 46 as it travels helically up in a path alongside the driving cage, before being fed outwardly at 50, as shown. The driving cage has a particular radius of curvature R, which in the usual situation was not matched closely by the belt's minimum possible radius. This created the situation described above.

FIG. 3A shows schematically in plan view a radius conveyor belt 52 which can be identified as a basic modular radius conveyor belt for purposes of this invention. The basic conveyor belt 52 is shown traversing a curve with radius $R_1$, the minimum possible curve radius for the defined basic radius conveyor belt.

FIG. 3B shows schematically in plan view a driving cage or tower 42a, with bars 44, this driving tower having a driving radius of $R_2$ larger than $R_1$. Thus, the basic radius conveyor belt 52 can be used on a spiral conveyor belt system having the driving cage 42a, although the inner sides of the belt rows will not be fully collapsed as the belt traverses the curvature of the driving tower.

FIG. 3C shows schematically a modular conveyor belt 54 of the type which is supported on a platform or wear strip and which passes through horizontal curves. FIG. 3C shows a curve with radius $R_3$ in the conveyor belt 54, $R_3$ again being larger than $R_1$, the tightest possible curvature of the basic radius conveyor belt 52. Thus, the basic belt 52 can be used as the conveyor belt 54. However, as in the spiral system, the module rows of the belt 54 will not be fully collapsed together at the inner side of the curve of radius $R_3$.

Figure 4:
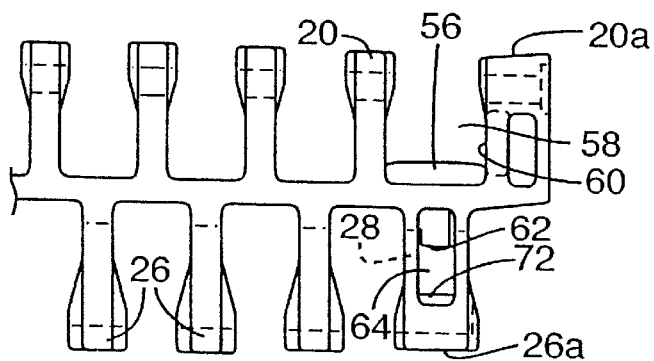
FIG. 4 is a schematic view showing several alternative methods for restricting the radius of curvature of a basic radius conveyor belt.

FIG. 4 is a fragmentary view of a belt module and shows some methods for restricting the radius of turning of a plastic modular conveyor belt. According to one method and device, a plastic shim or blocking element 56 is placed in at least one spacing 58 between projecting link ends 20, 20a as shown. The shim 56 can be secured into the inter-link end spacing by adhesive, heat bonding or solvent bonding, screws, clips or interference fit (press fit). For this purpose, undercuts (not shown) can be formed at the base ends 60 of the link ends, to seat the shim or blocking member 56.

Another form of shim or blocking member 62 is shown in one of the second series of projecting link ends 26a in FIG. 4. The blocking member 62 is placed so as to block a portion of the full length of the slotted aperture 28 in the link end 26a closely adjacent to the edge of the module row, or this could be done in inboard link ends 26 if desired, just as the blocking member 56 could be placed inboard if desired. In the case of the shim 62 in the edge link end 26a, the shim 62 can be placed via a top-to-bottom opening 64 which is included in the edge link ends of the style of belt illustrated. Again, the shim can be secured by various means, including adhesive, heat bonding, press fit, screws, etc.

The positioning of a shim or blocking member is not limited to what is shown in FIG. 4. As can be seen from FIG. 1, a shim could be placed in many different locations in order to inhibit the projections from fully collapsing together and into contact (contact is shown in FIG. 1), and these could include positions such as at 66, 68 and 70 in FIG. 1, as well as positions which will inhibit the connecting rod 24 from moving to its deepest possible position within the slotted aperture, which is the function of the shim 62 shown in FIG. 4. Material can be added at these various locations to inhibit collapse, with the added material retained by adhesive, mechanical attachment or heat bonding.

Still another form of shim 72 is shown in FIG. 4, blocking a portion of the slotted aperture 28 near the outer side of the projecting link end 26a, but this type of shim 72 is used at the outer side of the conveyor belt relative to a curve. Such a shim 72 will restrict the effective turning radius of the belt by preventing full extension of the modules apart at the outside of the curve. Its use will result in the belt's tension being carried at a single point of contact during straight travel of the belt, but in systems where tension is low through the straight travel portions, this can be one approach to adjusting the belt radius.

The shims, particularly the shims 56 or 62 for the inside of the curve, can be of resilient material (rubber, elastomeric plastics, etc.) if desired, to provide a resilient cushion in the collapsed-together inner edges of the modules.

FIG. 5 shows an edge portion of a belt module 85, the module having edge front and rear projections 86 and 88 which in this case are wider than normal projections 90. At the extreme edge, 65 the projection or link end 86 is provided with a means to mechanically receive a collapse-limiting device 92. The projection or link end 86 has a recess 94 which may be keyholeshaped as shown, for receiving the collapse-limiting device 92, in the form of a plug with a nipple or ridge type extension as shown at 96. The plug device 92 fits tightly within the recess 94, and may include an interference ring or O-ring 98 to snap within a complementarily shaped groove (not shown) at the appropriate location in the recess 94. The nipple or ridge 96 acts as a projection or shim that limits the nesting of a similar link end 86 of a succeeding module, against the shoulder 100 of the illustrated module's link end 86. A series of plug devices 92 of different ridge 96 sizes can be provided, thus allowing a series of different degrees of limitation of the inner-side collapse of the modified belt.

Other forms of snap-on or assembled-on collapse limiting devices can be used. Side plates, often provided as accessories on plastic modular conveyors for retention of items on the belt or for other purposes, can be configured to interfere with full collapse of the belt together at the inner edge on curves, to varying degrees as selected by the accessory used. These can be at the inner edge of the module rows or somewhat toward center from the edge.

As noted above, restriction of collapse radius can also be achieved by substituting modules, preferably at the inner side of the curve. The substitute modules, in each row or every second or third, etc., row, are configured to have the same effect as the shims or inserts shown in FIG. 4. They can be integrally molded if desired, to have the same radius-limiting structure as the shims 56, 62 or 72. Another method for adjusting the effective radius of the belt is to substitute entire rows of modules with modules of different effective turning radius. Thus, every other row, or every third row, etc., of a basic radius conveyor belt can be replaced with modules which are not capable of as tight a turning radius. This is primarily effective to limit the extension between modules at the outside of the belt, which limits curve radius.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A method for fitting a radius plastic conveyor belt, of the type having interconnected rows of plastic modules with forward and rear projecting link ends interdigited with similar link ends of preceding and succeeding module rows and with rods connecting adjacent rows extending through apertures in the projecting interdigited link ends, some of the link ends which have elongated slotted apertures allowing collapsing together of the rows at the inner side of a curve, to a spiral conveyor belt system in which the belt is driven at a radius fixed by a driving cage or tower of the system by contact between the outside of the cage or tower and an inner edge of the belt, comprising:

defining said radius conveyor belt as a basic radius conveyor belt defined by modules that allow a degree of collapse to define a preselected minimum radius of curvature which is small enough to allow the basic radius conveyor belt to be used a plurality of spiral conveyor systems having different driving tower radii, the basic radius conveyor belt having an side, selecting a spiral conveyor belt system to which a radius plastic conveyor belt is to be fitted, the spiral belt system having a driving tower radius larger than said preselected minimum radius, modifying the basic radius conveyor belt by placing at She inner side of the basic radius conveyor belt, modules restricted to more limited degree of collapse than other modules of the belt, thereby restricting the ability of the conveyor belt to collapse together at the inner side of the belt, the restricted collapsibility being such as to limit the radius of curvature of the entire belt and to substantially match the actual radius of curvature of the spiral conveyor belt system.

2. The method of claim 1, wherein the step of placing modules at the inner side of the conveyor belt comprises placing such modules in fewer than all module rows.

3. The method of claim 1, wherein the step of placing modules at the inner side of the conveyor belt comprises placing such modules in all module rows.

4. The method of claim 1, wherein said conveyor belt modules restricted to more limited degree of collapse comprise modules with slotted apertures shorter in length than slotted apertures of said other modules.

5. The method of claim 1, wherein said conveyor belt modules restricted to more limited degree of collapse comprise modules fitted with a restricting device positioned to prevent full collapsing together of adjacent module rows.

6. The method of claim 5, wherein said restricting device comprises a shim placed in at least one slotted aperture in each of a plurality of module rows near the inner side of the conveyor belt.

7. The method of claim 5, wherein said restricting device comprises a shim placed in certain modules between adjacent link ends of the module in a position to block an interdigited link end of an adjacent module row from fully nesting together against said certain modules thus preventing full collapsing together of adjacent module rows, said certain modules being at regular spacings along the length of the belt and adjacent to the inner side of the conveyor belt relative to curving travel of the belt.

8. A method for fitting a radius plastic conveyor belt, of the type having interconnected rows of plastic modules with forward and rear projecting link ends interdigited with similar link ends of preceding and succeeding module rows and with rods connecting adjacent rows extending through apertures in the projecting interdigited link ends, some of the links ends which have elongated slotted apertures allowing collapsing together of the rows at the inner side of a curve, to a conveyor belt system in which the belt is driven at a certain radius, comprising:

defining said radius conveyor belt as a basic radius conveyor belt defined by modules that allow a degree of collapse to define a preselected minimum radius of curvature which is small enough to allow the basic radius conveyor belt to be used on a plurality of conveyor systems having different curve radii, selecting a conveyor belt system to which a radius plastic conveyor belt is to be fitted, the conveyor belt system having a curve radius larger than said preselected minimum radius, modifying the basic radius conveyor belt by placing in the basic radius conveyor belt at selected locations, modules effective to restrict angular shifting of adjacent module rows on curves, thereby limiting the radius of curvature of the entire belt such as to substantially match the actual radius of curvature of the selected conveyor belt system.

9. The method of claim 8, wherein the step of placing modules comprises placing such modules at an inner side of the conveyor belt.

10. The method of claim 8, wherein the step of placing modules comprises placing throughout the width of each of a plurality of module rows, similar modules restricted to less angular shifting with adjacent rows.

11. The method of claim 8, wherein said conveyor belt modules effective to restrict angular shifting comprise modules with slotted apertures shorter in length than slotted apertures of other modules.

12. The method of claim 8, wherein said conveyor belt modules effective to restrict angular shifting comprise modules fitted with a restricting device positioned to prevent full collapsing together of adjacent module rows at an inner edge of the belt.

13. The method of claim 12, wherein said restricting device comprises a shim placed in at least one slotted aperture in each of a plurality of module rows near an inner side of the conveyor belt.

14. The method of claim 12, wherein said restricting device comprises a shim placed in certain of the modules in a position to block an interdigited link end of an adjacent module row from fully nesting together against said certain modules thus preventing full collapsing together of adjacent module rows, said certain modules being at regular spacings along the length of the belt and adjacent to the inner side of the conveyor belt relative to curving travel of the belt.

15. The method of claim 14, wherein said shim comprises a snap-in plug with a projecting ridge, the module having a recess to receive the snap-in plug in a position such that the ridge projects outwardly from the module to block full nesting with an adjacent module.

16. The method of claim 12, wherein said restricting device comprises an accessory attached to selected belt modules near the inside of a curve of the belt.

* * * * *

UNITED STATES PATENT AND TRADEMARK OFFICE
CERTIFICATE OF CORRECTION

PATENT NO. : 6,484,379 B2
DATED : November 26, 2002
INVENTOR(S) : Eric K. Palmaer It is certified that error appears in the above-identified patent and that said Letters Patent is hereby corrected as shown below:

Column 6,
Line 45, -- inner -- should be inserted before "side".
Line 51, "She" should be -- the --.

Signed and Sealed this

Twenty-fifth Day of March, 2003

JAMES E. ROGAN
*Director of the United States Patent and Trademark Office*